United States Patent [19]

Marin et al.

[11] Patent Number: 4,698,009
[45] Date of Patent: Oct. 6, 1987

[54] GRANULATOR FOR CROSS-LINKABLE PLASTIC

[75] Inventors: Carlo Marin, Vigevano; Gianmario Lanfranconi, Trezzo d'Adda; Andrea Borroni, Carimate, all of Italy

[73] Assignee: Societa' Cavi Pirelli S.p.A., Milan

[21] Appl. No.: 864,039

[22] Filed: May 16, 1986

[30] Foreign Application Priority Data

May 31, 1985 [IT] Italy ............................ 20993 A/85

[51] Int. Cl.$^4$ ............................................ A01L 21/00
[52] U.S. Cl. ..................................... 425/196; 425/217; 425/198; 425/311
[58] Field of Search ................................ 425/196–198, 425/215–217, 308, 310, 311, 378 R, 379 R, 382 R; 210/433.1, 409

[56] References Cited

U.S. PATENT DOCUMENTS

| | | | |
|---|---|---|---|
| 3,509,598 | 5/1970 | Van Den Biggelaar | 425/198 |
| 3,599,285 | 8/1971 | Hamilton | 425/311 X |
| 3,599,292 | 8/1971 | Camerlaxa et al. | 425/197 X |
| 3,641,232 | 2/1972 | Fontijn et al. | 425/198 X |
| 3,770,130 | 11/1973 | Brookins et al. | 210/433.1 X |
| 3,817,377 | 6/1974 | Piggott | 425/197 X |
| 4,604,202 | 8/1986 | Movshovitz | 210/409 |

Primary Examiner—Charles Hart
Attorney, Agent, or Firm—Brooks Haidt Haffner & Delahunty

[57] ABSTRACT

A granulator for forming granules of cross-linkable plastic compounds in which a screw extruder extrudes the compound into the smaller diameter end of a funnel-shaped, annular conduit, the other end of the conduit facing a die with circular arrays of through-holes. The compound which passes through the through-holes is cut into granules by rotating blades having air nozzles which remove particles of the compound from the blades. The granules are received in a chamber from which they are removed pneumatically. Where the annular conduit meets the die, there are channels within and outside of the arrays of through-holes which lead to the outside of the granulator and which provide conduits for removal of compound which does not directly impinge on the entrances of the through-holes which are specially shaped to avoid accumulation of the compound between the through-holes.

7 Claims, 4 Drawing Figures

GRANULATOR FOR CROSS-LINKABLE PLASTIC

The present invention relates to a granulator device and particularly, to a device for producing granules which are formed out of a cross-linkable plastic compound.

More specifically, the present invention relates to a device that is particularly suited for forming granules out of a cross-linkable plastic compound which are intended for manufacturing cross-linkable, extruded insulation, such as, for example, cable insulation.

Cables with extruded, cross-linkable insulation are produced by forming, by means of an extruder fed with cross-linkable plastic granules, an insulation over the conductor. Subsequently, the extruded insulation is cross-linked.

For realizing cross-linked insulations having high dielectric strength, it is necessary for the insulation itself to be perfectly uniform and to be without any discontinuity. This requires that the granules, with which the extruder is fed, to have uniform characteristics, and to not contain any small agglomerations or lumps of cross-linked material which have already become partially or totally cross-linked.

The known granulators for cross-linkable plastic compounds do not differ from those used for linkable plastic compounds which are not cross-linkable. Examples of granulators of this type are those described in U.S. Pat. Nos. 3,114,169 and 3,323,170. Such known granulators are unable to guarantee, in an absolute manner, the absence of already partially cross-linked agglomerations or lumps of the granules in the mass of granules produced.

The known granulators comprise an extruder, in communication with an extruder head, which is adapted to continuously draw a plurality of filaments of a plastic compound. A rotating blade, connected to the extruder head, cuts these filaments as they are gradually formed and in this way, provide the granules.

In particular, the extruder head of the known devices, comprises a slab or die provided with a plurality of through-holes which are parallel to one another and which are distributed in an annular crown-shaped formation which is coaxial to the axis of the slab itself. The compound, coming from the extruder, enters the extruder head, and it is conveyed into the through-holes by means of a funnel-shaped conduit which increases in diameter in the direction of said slab.

In spite of every care taken when conveying the compound of cross-linkable material toward the holes in the slab, the known granulators have not succeeded in preventing static portions of the compound inside the extruder head. The cross-linking which is commenced at these portions gives rise to formations of lumps and agglomerations of partially or completely cross-linked material, at least in the granules.

Accordingly, the material of the granules produced is not uniform which causes the formation of extruded cross-linked cable insulation with a discontinuous and non-uniform structure and hence, with a degradation of its dielectric strength. Therefore, cables with such defects are subject to a great probability of perforation or breakdown risks during operation.

One object of the present invention is to provide a compact granulator for cross-linkable plastic compounds which does not have the drawbacks found in the known granulators because the granulator of the insulation is capable of producing granules which are all substantially formed of an uncross-linked, cross-linkable material and which all have uniform characteristics.

In accordance with the present invention, the granulator comprises an extruder head which contains a filter and which is provided with a slab having a plurality of through-holes which are parallel to one another and which are distributed in an annular crown-shaped array coaxial to the slab. An annular, funnel-shaped conduit, which increases in size in the direction of the slab opens against one of the sides of the slab where the through-holes are present, and a rotating blade is adjacent the other side of the slab. The granulator has at least an annular channel which communicates with the exterior of the granulator and with the coupling zone between the funnel-shaped annular conduit and the slab. Preferably, the annular channel comprises a first annular channel at the radially outermost edge of the funnel-shaped annular conduit at the slab, and a second annular channel at the slab and at the radially innermost edge of the funnel-shaped annular conduit, said first and second channels communicating with the exterior of the granulator.

Other objects and advantages of the present invention will be apparent from the following detailed description of the presently preferred embodiments thereof, which description should be considered in conjunction with the accompanying drawings in which.

Figure 1:
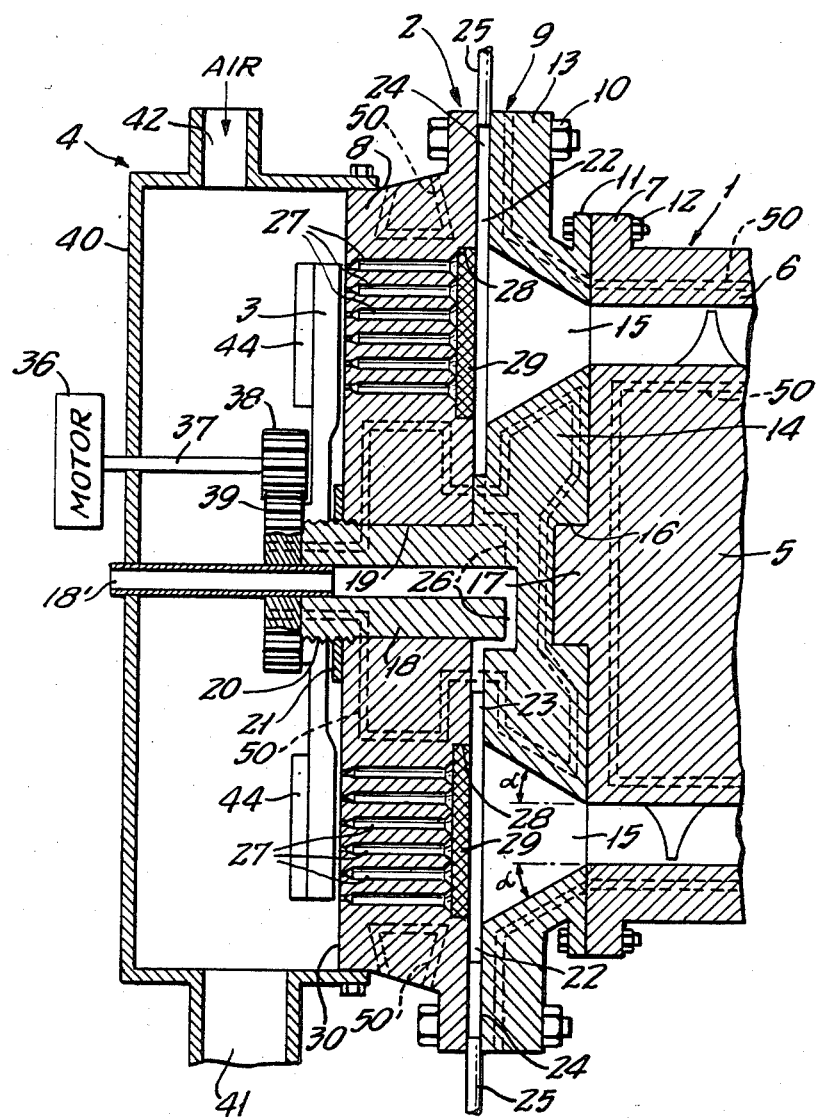
FIG. 1 is a schematic cross-sectional side view of the granulator of the invention.

As can be seen in FIG. 1, the apparatus of the invention comprises an extruder 1, an extruder head 2 provided with a rotatable blade 3 and a collecting chamber 4 for the granules produced.

The extruder 1 is a screw-type of extruder, and it includes a screw 5 enclosed inside a casing 6 which is provided with a flange 7 for connecting it to the extruder head 2.

The extruder head 2 comprises a die in the form of a slab 8 and a body 9 (both to be described in detail hereinafter) which are secured together at their edges, for example, by means of through-bolts 10.

The body 9 has a flange 11 which is secured to the flange 7 of the extruder casing 6 by through-bolts 12. Said body 9 is formed by an annular element 13 and by a disc 14. The annular element 13 which encircles and is coaxial to the disc 14, forms, with the disc 14, a funnel-shaped, annular conduit 15 which increases in size in the direction of the slab 8. In particular, the walls of the conduit 15 have an angle α of inclination with respect to the axis of the slab 8, and this angle has a value in the range from 0° to 35°.

When the inclination of the walls of the conduit 15 is of an angle α over 35°, the plastic filaments formed at the radially outermost zone of the extruder head have a lower rate of formation than those formed in the radially innermost zone of the extruder head.

Bearing in mind that the blade cuts all the filaments substantially simultaneously to provide the granules, granules having different lengths would be obtained.

Therefore, granules of non-uniform dimensions are obtained since the granules formed in the radially innermost zone of the extruder head would have greater lengths as compared to those which are formed in the radially outermost zone of the extruder head.

The annular element 13 is interposed between the slab 8 and the cylindrical casing 6 of the extruder and is also secured to both. The disc 14 has, in a central position of the side facing the extruder screw 5, a cavity 16 which receives a protuberance 17 extending from the head of the screw 5.

Also, at the other side of the disc 14, there is a tubular member 18 which passes through a hole 19 made in the central portion of the slab 8. The free end 20, of the tubular member 18, extends from the slab 8, and the member 18 is secured to the slab 8 by means of a ring-nut 21.

As previously stated, the body 9 and the slab 8 of the extruder head, are coupled together, and this coupling takes place through the contact had between their reciprocally facing surfaces. Such facing surfaces are such as to provide, in the reciprocal coupling zone, at least one annular channel which communicates with the exterior of the apparatus. Preferably, the reciprocally facing surfaces of the body 9 and the slab 8 have the characteristics described hereinafter.

The surface of the body 9 which faces the slab 8 has circular channels 22 and 23 at the larger end of the annular conduit 15. The channel 22 is at the radially innermost edge of the annular element 13 of the body 9, and the circular channel 23 is at the radially outermost edge of the disc 14.

Grooves 24, extending from the channel 22, are formed on the surface of the annular element 13 which is in contact with the slab 8. The grooves 24 extend to the outer edge of the annular element 13 where they are connected to the tubes 25 by which rejected plastic material may be conveyed elsewhere, such as to a waste bin.

Channels 26 put the channel 23 of the disc 14 into communication with the bore of the tubular member 18 which also receives a tube 18' which traverses the collecting chamber 4, the chamber 4 being described in further detail later herein. In this way, in the coupling zone between the slab 8 and the body 9, there are provided a first annular channel 22 which communicates with the exterior of the extruder-head and which is at the radially outermost edge of the funnel-shaped, annular conduit 15 and a second annular channel 23 which communicates with the exterior and which is at the radially innermost edge of the funnel-shaped annular conduit 15.

Although a particular embodiment of the first and the second annular channels for putting the funnel-shaped annular conduit 15 into communication with the exterior has been described, it will be apparent to those skilled in the art that such channels may be otherwise provided.

What is of importance for the purpose of the invention, is the presence of at least one annular channel which communicates with the exterior, and preferably, of first and second annular channels which communicate with the exterior and located, respectively, at the radially innermost and radially outermost edges of the funnel-shaped annular conduit 15, and disposed where the conduit 15 meets the slab 8. As a consequence, any configuration of the extruder head 2 which provides at least one annular channel, and preferably, said first and second annular channels, in communication with the exterior, will accomplish the object of the invention.

The slab 8 has a plurality of through-holes 27 which are parallel to one another. Said through-holes in the slab 8 are disposed in such a way as to provide circular arrays thereof which face the funnel-shaped, annular conduit 15. At the side of the slab 8 which faces the body 9, the slab 8 has a circular recess 28 which overlies the entire zone where the through-holes 27 are present.

Inside the recess 28, there is a filter 29 made, for example, of a metallic netting having the form of an annulus with its inner and outer radii being substantially the same as those of the circular arrays of through-holes 27 in the slab 8.

The component parts of the extruder and of the extruder head are temperature regulated, such as by means of circulating pressurized water in the conduits 50 (shown in broken lines in FIG. 1).

Figure 2:
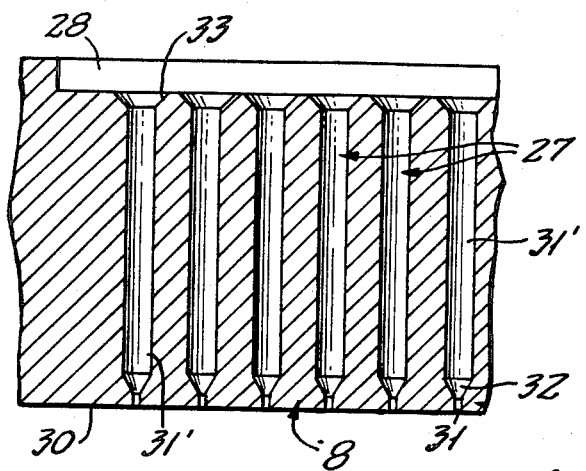
FIG. 2 is a fragmentary, enlarged, cross-sectional view of a portion of the slab having holes for the passage of the compound being extruded.
Figure 3:
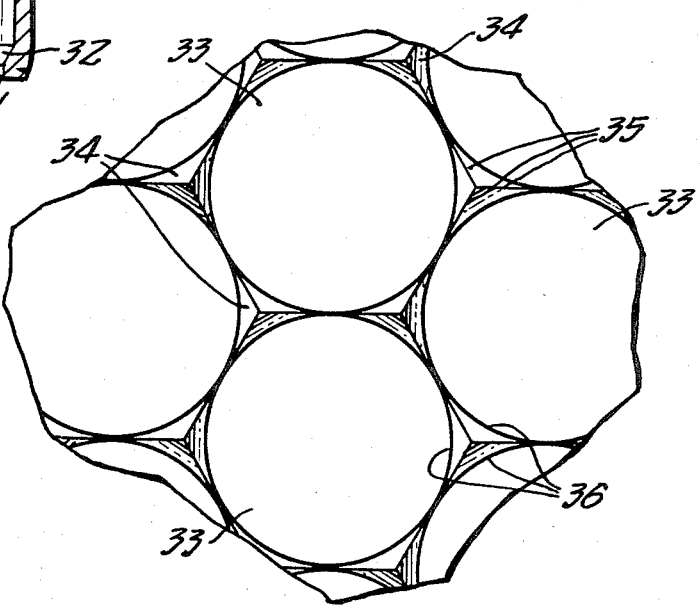
FIG. 3 is a fragmentary, enlarged, end view of a portion of a face of said slab.

FIGS. 2 and 3 illustrate, in enlarged scale, a portion of the slab 8 which has the through-holes 27. As is seen in FIG. 2, starting from the side 30 of the slab 8 which is the side in contact with the blade 3 (FIG. 1), the through-holes 27 have the following configuration.

Each through-hole 27 has a cylindrical end portion 31, and a cylindrical central portion 31' of greater diameter than the end portion 31. These two cylindrical portions 31 and 31' are connected to each other through a truncated cone portion 32.

The central portion 31' terminates at one end with a flared portion 33 extending to the recess 28 at the other side of the slab 8, i.e., the side against which the funnel-shaped annular conduit 15 ends (FIG. 1).

As can be seen in FIG. 3, the flared portions 33 of adjacent through-holes 27 are tangent to one another. Moreover, the surfaces 34 between the flared portions 33 have a pyramid-form with sharp corners 35 and curvilinear sides 36.

Figure 4:
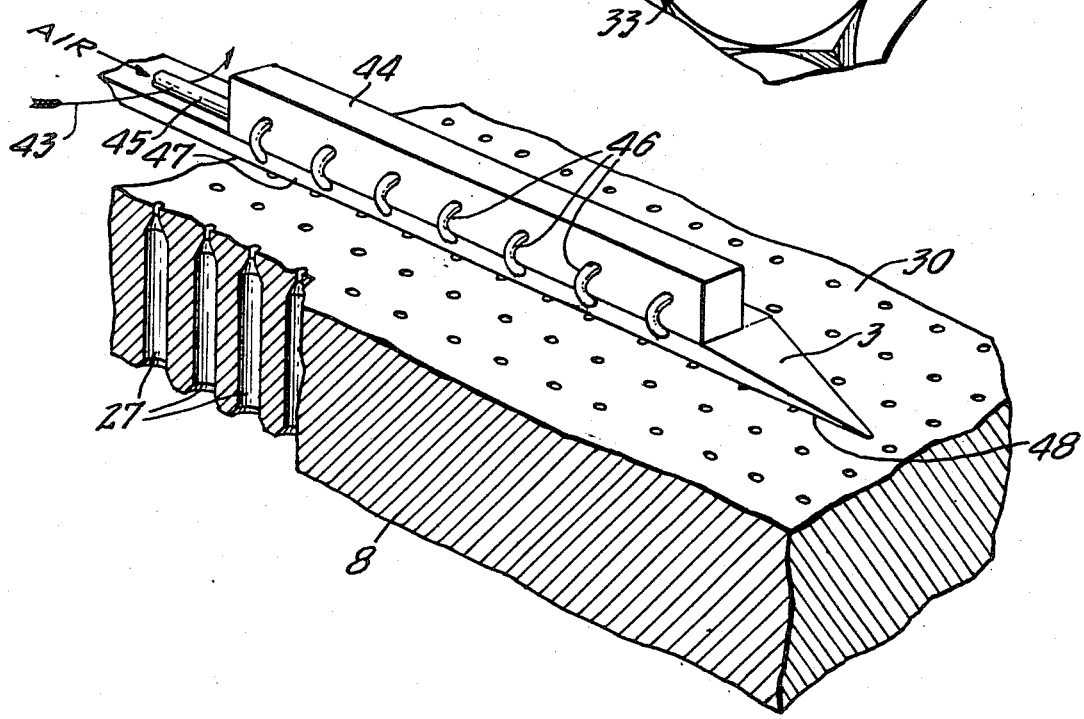
FIG. 4 is a fragmentary, enlarged, perspective view of a portion of the cutting blade granulator in association with said slab.

As previously described and is shown in FIGS. 1 and 4, a rotating blade 3 is connected to the extruder head 2. The rotating blade 3 is rotated on an end portion 20 of the tubular member 18 and is rotatable by a motor 36 through a shaft 37 and the gears 38 and 39. The rotating blade 3 is enclosed inside a casing 40 which provides a chamber 4 for collecting the granules which are produced and which are removed from the chamber 4 pneumatically through the aperture 41 by means of an air stream supplied through the aperture 42, the air stream also cooling the granules.

FIG. 4 illustrates in enlarged scale detail one of said blades 3 and a portion of the slab 8 of the device. As can be seen in FIG. 4, the blade 3, which moves in the direction of the arrow 43 and overlies the slab 8, carries a compressed air reservoir 44. The reservoir 44 is connected, through a tube 45, to a per se known compressed air device (not shown) which is capable of providing such air to the reservoir 44 while said reservoir moves with blade 3. Nozzles 46 extend from the reservoir 44 and direct a flow of compressed air against the blade surface 47 which is the upstream or trailing surface with respect to the direction of movement of the blade 3. In this way, the edge 48 of the blade is kept clean thereby eliminating the presence on it of residues of cross-linkable material.

The functioning of the granulator, according to the invention, will now be described.

The extruder screw 5, which is rotated around its own axis by a motor (not shown in the drawings), causes a cross-linkable plastic compound to advance towards the funnel-shaped, annular conduit 15 of the extruder head 2. The funnel-shaped, annular conduit 15 directs the compound towards the plurality of through-holes 27 in the slab 8.

That part of the compound which, during its passage into and through the funnel-shaped, annular conduit 15, contacts the walls of the conduit 15, does not pass into the through-holes 27, but flows, instead, outside of the extruder head 2 and hence, of the apparatus, by passing through the first and the second annular channels 22 and 23 at the joining zone between the slab 8 and the body 9, of the extruder head. The part of the compound which reaches the through-holes 27 issues forth from the holes 27 in the form of cross-linkable plastic filaments.

The rotating blade 3 cuts the cross-linkable plastic material filaments as they gradually form, thereby providing granules which are collected in chamber 4. The granules are removed from the chamber 4 pneumatically, by means of an air flow.

Apart from providing for the pneumatic transportation of the granules, the air flow also causes the granules to cool which prevents conglomeration of the granules.

From the description of a specific embodiment of a granulator of the invention and from the considerations set forth hereinafter, it will be understood how the objects of the invention are attained.

In a granulator according to the invention, the presence of annular channels which communicate with the exterior of the granulator and which surround the portion of the slab 8 having the through-holes 27, prevents the formation of static portions of cross-linkable plastic compound inside the extruder head 2.

Considering the fact that such static portions of cross-linkable plastic materials in the compound are undesirable, since at least the beginnings of cross-linking of the compound itself takes place therein, the elimination of such static portions means that the granulator of the invention produces substantially only granules which are not cross-linked. Therefore, the granules will have uniform characteristics in the component material.

Hence, for avoiding any formation of said static portions, the presence of at least one annular channel 22, and preferably, of two annular channels 22 and 23, is essential.

Other elements of the device also contribute to assuring the complete achievement of these results.

One of these other elements is constituted by the compressed air nozzles 46 which keep the blades 3 clean by preventing any particles of cross-linkable material compound from forming and remaining on the blades.

Another element is the particular configuration of the surface of the slab 8 which faces the funnel-shaped, annular channel at the portion thereof where the through-holes 27 are present, as was previously described with reference to FIG. 3.

In fact, the presence of the flared portions 33 of the through-holes 27 and the fact that the surface of the slab 8 between such flared portions and adjacent through-holes 27 has the shape of a pyramid provided with sharp corners and curvilinear sides, eliminates the possibility of static portions of the plastic material occurring when the compound passes through the extruder head.

Thus, risks of alterations of the compound taking place, through an incipient vulcanization of the compound, are eliminated and hence, maximum uniformity of the material of the produced granules is assured.

Finally, the presence of the filter 29 in a recess in the slab 8 and in contact with the portion of the slab 8 where the through-holes 27 are present permits the granulator of the invention to have maximum compactness.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A granulator for forming granules of a cross-linkable plastic compound, said granulator comprising:
   a filament forming die having an entrance side and an exit side, said die having a plurality of through-holes extending axially of said die from said entrance side to said exit side and disposed in circular rows concentric with the axis of said die;
   conduit means for supplying said compound to said through-holes, said conduit means being annular and having an axis substantially co-extensive with said axis of said die and said conduit means having a funnel-shaped discharge portion at its end adjacent said die with the larger diameter end of the funnel-shaped discharge portion adjacent said die and with the inner and outer diameters of said discharge portion being respectively at least as small as and at least as large as the inner and outer diameters of said circular rows of through-holes in said die whereby said discharge portion of said conduit means opens towards and supplies said compound to all said through-holes around an axis substantially parallel to said axis of said die;
   at least one rotatable blade at said exit side of said die for cutting said compound into granules as it exits from said through-holes; and
   channel means forming at least one annular channel extending from adjacent said larger diameter end of said discharge portion and said entrance side of said die to exteriorly of said granulator for removing from the granulator the portions of said compound which engage a wall of said discharge portion as said compound is being supplied to said die through said conduit means.

2. A granulator as set forth in claim 1 wherein said channel means forms a first annular channel extending from the largest diameter portion of said discharge portion of said conduit to exteriorly of said granulator and a second annular channel extending from the smallest diameter portion of said discharge portion of said conduit to exteriorly of said granulator.

3. A granulator as set forth in claim 1 wherein said through-holes decrease in diameter from a larger diameter at said entrance side of said die to a smaller diameter in the direction of said exit side of said die and wherein said die has surfaces of said entrance side and intermediate said through-holes which have the shape of a pyramid.

4. A granulator as set forth in claim 1 further comprising air nozzles mounted on said blade and directed toward the surface of said blade which engages said compound as it exits from said through-holes and means for supplying air at a pressure above atmospheric pressure to said nozzles.

5. A granulator as set forth in claim 4 wherein said nozzles extend toward the trailing surface of said blade.

6. A granulator as set forth in claim 1 wherein the angle of the surface of said discharge portion of said conduit with respect to said axis of said conduit means is not greater than 35°.

7. A granulator as set forth in claim 1 wherein said die has a recess at said entrance side thereof from which said plurality of through-holes extend toward said exit side of said die and further comprising a filter in said recess through which said compound passes to said through-holes.

* * * * *